US006531977B2

(12) United States Patent
McEwan

(10) Patent No.: US 6,531,977 B2
(45) Date of Patent: Mar. 11, 2003

(54) PULSE CENTER DETECTOR FOR RADARS AND REFLECTOMETERS

(75) Inventor: Thomas E. McEwan, Carmel Highlands, CA (US)

(73) Assignee: McEwan Technologies, LLC, Las Vegas, NV (US)

( * ) Notice: Subject to any disclaimer, the term of this patent is extended or adjusted under 35 U.S.C. 154(b) by 0 days.

(21) Appl. No.: 09/922,534

(22) Filed: Aug. 3, 2001

(65) Prior Publication Data

US 2003/0025626 A1 Feb. 6, 2003

(51) Int. Cl.[7] ............................. G01S 13/00; G01S 13/08
(52) U.S. Cl. ......................... 342/21; 342/124; 342/189; 342/195
(58) Field of Search ........................... 342/21, 118, 124, 342/189, 194, 195

(56) References Cited

U.S. PATENT DOCUMENTS

| 3,789,296 A | | 1/1974 | Caruso, Jr. et al. ..... 324/58.5 B |
| 3,922,914 A | | 12/1975 | Fuchs ....................... 73/290 R |
| 4,281,262 A | * | 7/1981 | Dressen .......................... 327/3 |
| 4,322,832 A | | 3/1982 | Sartorius ..................... 368/47 |
| 4,543,530 A | * | 9/1985 | Kovach ....................... 327/15 |
| 4,766,549 A | | 8/1988 | Schweitzer, III et al. ... 364/481 |
| 5,329,554 A | * | 7/1994 | Behrens et al. ............... 360/46 |
| 5,438,867 A | | 8/1995 | van der Pol .................. 73/290 |
| 5,457,990 A | | 10/1995 | Oswald ........................ 73/290 |
| 5,610,611 A | | 3/1997 | McEwan ..................... 342/89 |
| 5,969,666 A | | 10/1999 | Burger et al. ............... 342/124 |
| 6,137,438 A | | 10/2000 | McEwan ..................... 342/134 |
| 6,198,424 B1 | | 3/2001 | Diede et al. .................. 342/22 |
| 6,369,587 B1 | * | 4/2002 | Tu et al. ..................... 324/548 |

FOREIGN PATENT DOCUMENTS

EP    0 626 063 B1    11/1994

* cited by examiner

Primary Examiner—Thomas H. Tarcza
Assistant Examiner—Brian K Andrea
(74) Attorney, Agent, or Firm—Weide & Miller, Ltd.

(57) ABSTRACT

The pulse center detector (PCD) produces an amplitude-independent center-triggered range output for precision radar rangefinders and TDR systems. Pulse center triggering is accomplished by triggering leading-edge and trailing-edge detectors and summing the outputs to produce a computed center-triggered result. Since the occurrence time of a pulse center does not vary with amplitude, the PCD is amplitude-independent. The PCD overcomes limitations of prior automatic pulse detectors, such as the inherent latency of a constant fraction discriminator (CFD) and the uncertainty of a time-of-peak (TOP) detector. The PCD can be implemented with a single analog component—a comparator—and thus requires appreciably fewer analog components than prior automatic detectors while providing lower jitter. Applications include radar and TDR tank gauges, and radar rangefinders for robotics and automotive applications.

14 Claims, 3 Drawing Sheets

PULSE CENTER DETECTOR FOR RADARS AND REFLECTOMETERS

BACKGROUND OF THE INVENTION

1. Field of the Invention

The present invention relates to pulsed electromagnetic sensors, and more particularly to a pulse center detector (PCD) for pulse echo radar and time-domain reflectometry (TDR) sensors. These sensors can be used for rangefinding, for automation, or for determining the fill-level of a tank.

2. Description of Related Art

Radar echo pulses exhibit large amplitude variations, depending on target size, range and dielectric constant, and these variations produce range measurement errors when the pulses are detected with a fixed threshold detector. Echo amplitude variations also occur to a lesser extent with TDR-based tank level sensors, mainly being limited to dielectric constant variations of the liquid in the tank. However, accurate TDR-based tank level sensors require accurate, amplitude-independent pulse detectors.

Detectors with amplitude-tracking thresholds or other means to achieve amplitude independence are generally termed automatic pulse detectors and several automatic pulse detectors have been in existence for more than 30 years. U.S. Pat No. 5,610,611, High Accuracy Material Level Sensor, to McEwan, describes the well-known constant fraction discriminator, or CFD, for use in a TDR-based tank level sensor. The CFD in the '611 patent uses a peak detector to determine the peak amplitude of repetitive equivalent-time pulses and sets a trigger point that is a fraction of the peak amplitude, such as the half-way point on the rise of the pulse (half-max detection). Unfortunately, the CFD exhibits latency errors caused by slow peak tracking when the pulses decrease in amplitude. Latency is a particular problem when the CFD is used in a TDR level sensor for sloshing liquids in a tank, such as an automotive gas tank. Another potential problem with the peak detector is that it will lock-on to the strongest peak in a radar or TDR waveform, such as the main bang peak, and thus create errors in echo pulse detection—unless the CFD is provided with analog gating, or separate, gated CFD's are used for the transmit and echo pulses. Yet another problem with the CFD is that it will trigger on baseline noise when no echo pulses are present, so a threshold detector is needed to inhibit operation on weak pulses. To fully overcome all the limitations of a CFD, substantial additional circuitry is needed.

Another well-known automatic pulse detector is the time-of-peak (TOP) detector. The TOP detector differentiates pulses and triggers on the resulting zero axis crossings. To prevent false triggering on baseline noise, the desired pulses must be above a threshold before zero axis detection is enabled. This standard detector is utilized in an application to TDR in U.S. Pat. No. 5,457,990, Method and Apparatus for Determining a Fluid Level in the Vicinity of a Transmission Line, to Oswald, 1995. However, the TOP detector is less accurate than the CFD for the simple reason that a pulse peak is somewhat flat and has a low rate of change, making accurate time-of-peak detection difficult. Small baseline perturbations, such as baseline ringing or radar clutter, will sum with the pulse and substantially displace the exact time-of-peak. In contrast, a CFD detects at a fast slewing point of the pulse risetime, so the detection time is much less sensitive to baseline perturbations.

An amplitude-independent pulse detector is needed that (1) triggers on a high-slew point of a pulse like the CFD to avoid the inaccuracies of the TOP detector, (2) does not have the latency of the CFD, and (3) does not have the complexity of the prior automatic detectors.

SUMMARY OF THE INVENTION

According to the invention, a pulse center detector (PCD) threshold detects radar or TDR baseband transmit and echo pulses using a single fixed threshold comparator to produce transmit and echo detection pulses. The leading edges of the detection pulses are then formed into a leading-edge PWM (pulse width modulation) pulse (or "leading-PWM pulse") having a width proportional to the time between the leading-edge of the transmit pulse and the leading-edge of the echo pulse, i.e., the transmit-echo range. Similarly, a trailing-edge PWM pulse (or "trailing-PWM pulse") is formed from the trailing edges of the detection pulses.

The leading- and trailing-PWM pulses gate separate range counters. The range counts are added and divided by two to produce an average—or midpoint—count that corresponds to a PWM pulse centered on the baseband transmit and echo pulse centers. Thus, pulse center detection is achieved, i.e., the range is measured from the center of the transmit pulse to the center of the echo pulse.

By definition, a pulse center is the midpoint between its leading and trailing edge. The center of a pulse does not necessarily correspond to the peak of the pulse, but it often does. The PCD relates the pulse center to the time average of the leading and trailing edge times of the pulse.

An analog alternative to digital count summation involves simple resistive summing and integration of the leading-PWM and trailing-PWM pulses to produce a DC value corresponding to the time difference between the centers of the baseband transmit and echo pulses. This DC value is a range-proportional analog output voltage. Analog summation and integration is a simple approach suitable for driving analog "gas gauges." With either analog or digital summation, the final range indication is related to the centers of the transmit and echo pulses and does not vary with pulse amplitude. Although baseband pulses generally exhibit symmetric rise and fall times, asymmetric rise and fall times can be compensated by weighted PWM addition.

Timing jitter is lower in the PCD compared to prior automatic detectors since the addition of the leading and trailing PWM pulses averages the noise and yields a 3 dB reduction in noise, or equivalently, timing jitter.

The PCD can enhance the accuracy and reduce the cost of TDR-based electronic dipsticks for automotive gas gauges, industrial vat level sensors, automatic swimming pool regulators, and toilet tank level controllers. It can also be used to improve the performance of radar rangefinders for robotics or for automotive backup warning.

DETAILED DESCRIPTION OF THE INVENTION

A detailed description of the present invention is provided below with reference to the figures. While illustrative circuits are given, other embodiments can be constructed with other circuit configurations. All U.S. Patents and copending U.S. applications cited herein are herein incorporated by reference.

Figure 1A:
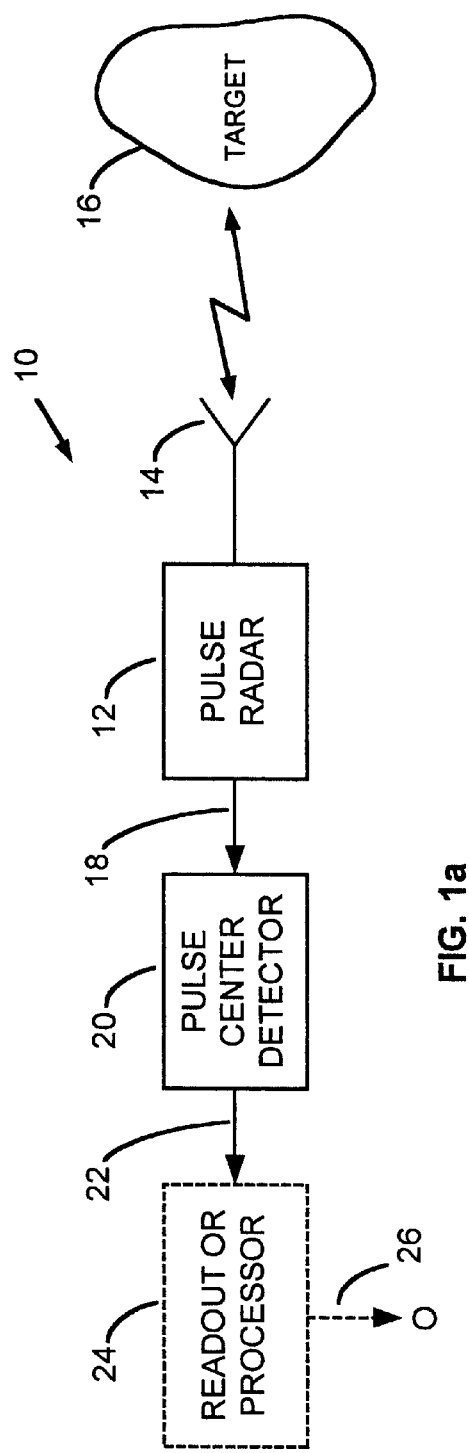
FIG. 1a depicts a radar system having a pulse center detector (PCD).

FIG. 1a depicts a pulse radar system 10 employing a pulse center detector (PCD) 20 of the present invention. Pulse radar 12 is generally a pulse-echo radar employing equivalent time sampling techniques. RF transmit pulses are radiated from transmit antenna 14 to target 16 and returning echoes are received by antenna 14 and detected by radar 12 to produce, in combination with the transmit pulses, baseband transmit and echo pulses on line 18. In the preferred embodiment, the baseband output is a sampled, equivalent time replica of the transmit and echo pulses passing through antenna 14. Also in the preferred embodiment, the baseband pulses are envelope detected unipolar pulses. Details of a pulse radar 12 are described in U.S. Pat. No. 6,137,438, Precision Short-Range Pulse-Echo Systems with Automatic Pulse Detectors, to McEwan. Line 18 is input to PCD 20. Pulse center detector 20 detects the baseband transmit and echo pulses at their centers and produces a range output on line 22 that is proportional to range, as defined by the time difference between the center of the baseband transmit pulse on line 18 and the center of the echo pulse on line 18. It should be understood that, in a less preferred mode, the transmit pulse on line 18 may be substituted with a reset pulse or a digital start pulse rather than the detected transmitted main-bang RF pulse. Also, the transmit pulse may be in the form of a close-in reflection from antenna 14 or other nearby reference reflector, (i.e., a fiducial pulse). A readout or processor 24 responsive to range output on line 22 may process and/or display range data, or provide an output on line 26 to control a parameter of another system such as a toilet valve or a vehicle braking system.

Figure 1B:
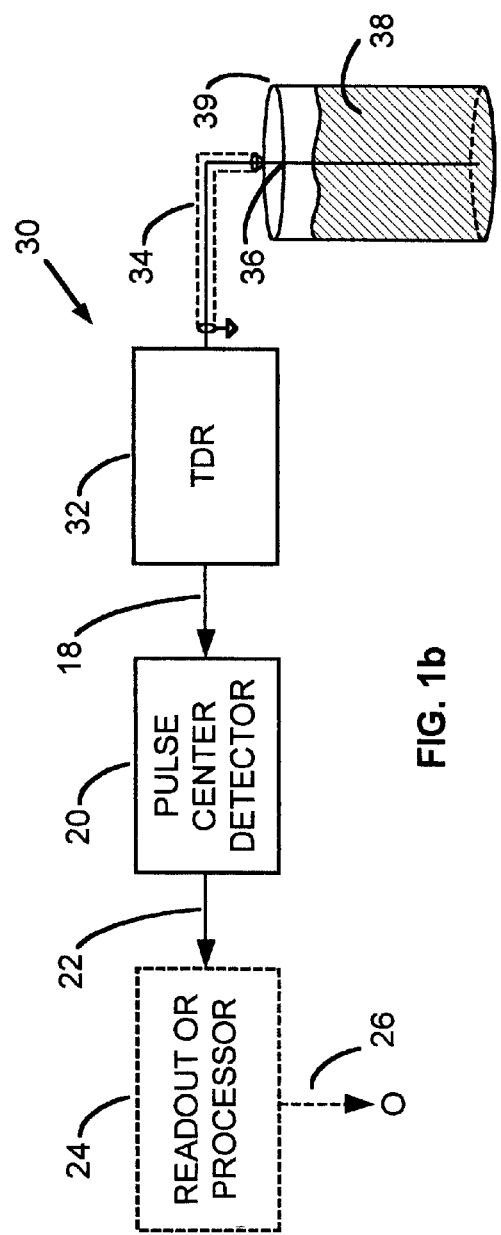
FIG. 1b depicts a TDR system having a PCD.

FIG. 1b depicts a TDR system 30 employing the pulse center detector (PCD) 20 of the present invention. TDR 32 is generally a pulse-echo time domain reflectometer employing equivalent time sampling techniques. Details of a sampling TDR 32 are described in U.S. Pat. No. 5,610,611, High Accuracy Material Level Sensor, to McEwan. Transmit pulses are propagated on transmission line 34 to a transmission line probe 36 which is at least partially immersed in a liquid 38 in a tank 39. Liquid 38 reflects the transmitted TDR pulses back as echo pulses to TDR 32, which produces baseband transmit and echo pulses on line 18. The function of references blocks 20 and 24, and line 26 are the same as for FIG. 1a. It should be understood that, in a less preferred mode, the transmit pulse on line 18 may be substituted with a reset pulse or a digital start pulse rather than the detected transmitted main-bang RF pulse. Also, the transmit pulse may be in the form of a tank-top reflection from probe 36 or other reference reflector, (i.e., a fiducial pulse).

Figure 2A:
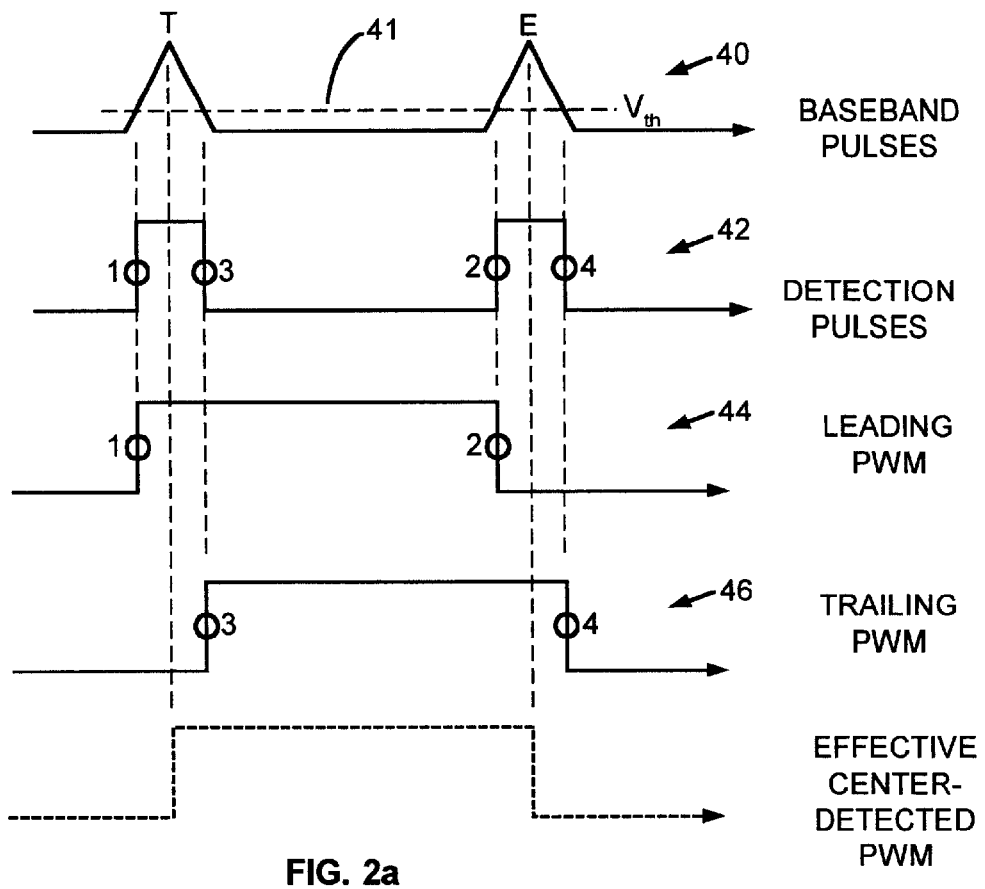
FIG. 2a is a timing diagram of the PCD.

FIG. 2a plots the waveforms associated with pulse center detector 20. BASEBAND PULSES 40 are input to the pulse center detector on line 18 and comprise a transmit pulse T and an echo pulse E. BASEBAND PULSES 40 preferably occur on a millisecond equivalent-time scale. DETECTION PULSES 42 result from threshold detecting the BASEBAND PULSES with a fixed threshold $V_{th}$, having an exemplary amplitude illustrated by dashed line 41. LEADING-PWM pulse 44 and TRAILING-PWM pulse 46 result from triggering a first flip-flop (or logical equivalent) on the leading edges (shown as edge circles 1 and 2) of the DETECTION PULSES 42 to produce LEADING-PWM pulse 44, and from triggering a second flip-flop (or logical equivalent) on the trailing edges (shown as edge circles 3 and 4) of DETECTION PULSES 42 to produce TRAILING-PWM pulse 46. PWM pulses 44 and 46 are then added and scaled to produce, in effect, a center triggered response, as will be discussed with respect to FIGS. 3a and 3b. An EFFECTIVE CENTER-DETECTED PWM pulse is plotted with dashed lines to illustrate its centering on the T and E pulse centers. It should be understood that the EFFECTIVE CENTER-DETECTED PWM is a computed result of adding the LEADING-PWM and TRAILING-PWM digital counts, or of adding the corresponding analog voltages, as will be discussed with reference to FIG. 3a and 3b; it does not exist as a real pulse.

Figure 2B:
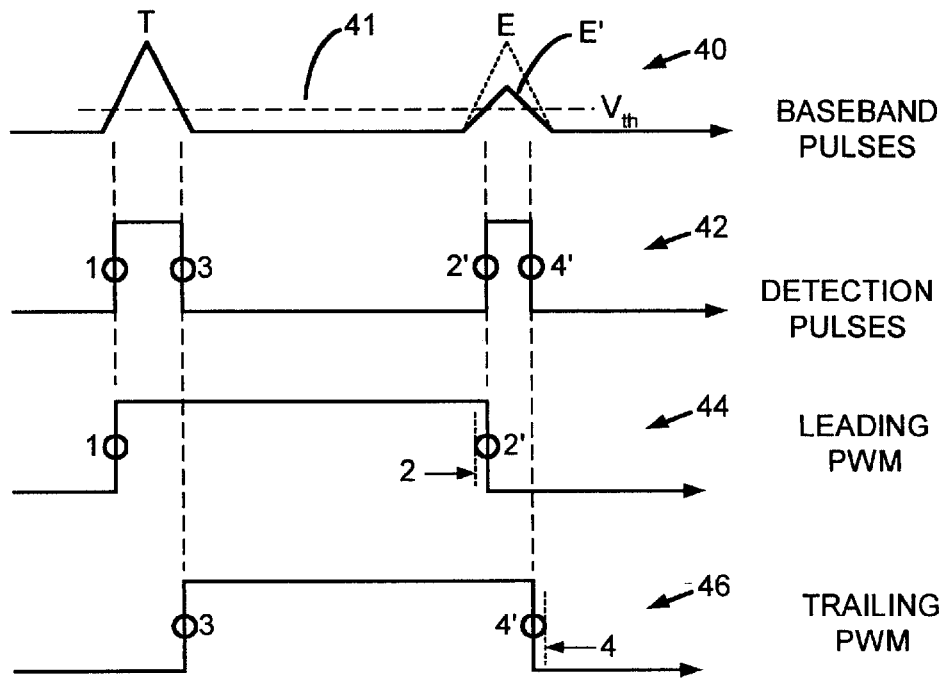
FIG. 2b is a timing diagram of the PCD with reduced echo pulse amplitude.

FIG. 2b illustrates the amplitude independent nature of the PCD. Echo pulse E' is shown with reduced amplitude compared to E of FIG. 2a. DETECTION PULSES exhibit shifted edges 2' and 4' due to pulse E' barely exceeding threshold 41. However, edges 2' and 4' have shifted in equal and opposite directions as can be seen with reference to edges 2 and 4 (dashed lines of FIG. 2b). After addition of PWM pulses 44 and 46, the effect of edge shifts from 2 to 2' and 4 to 4' cancel each other, thereby illustrating the amplitude independence of the apparatus and method.

Figure 3A:
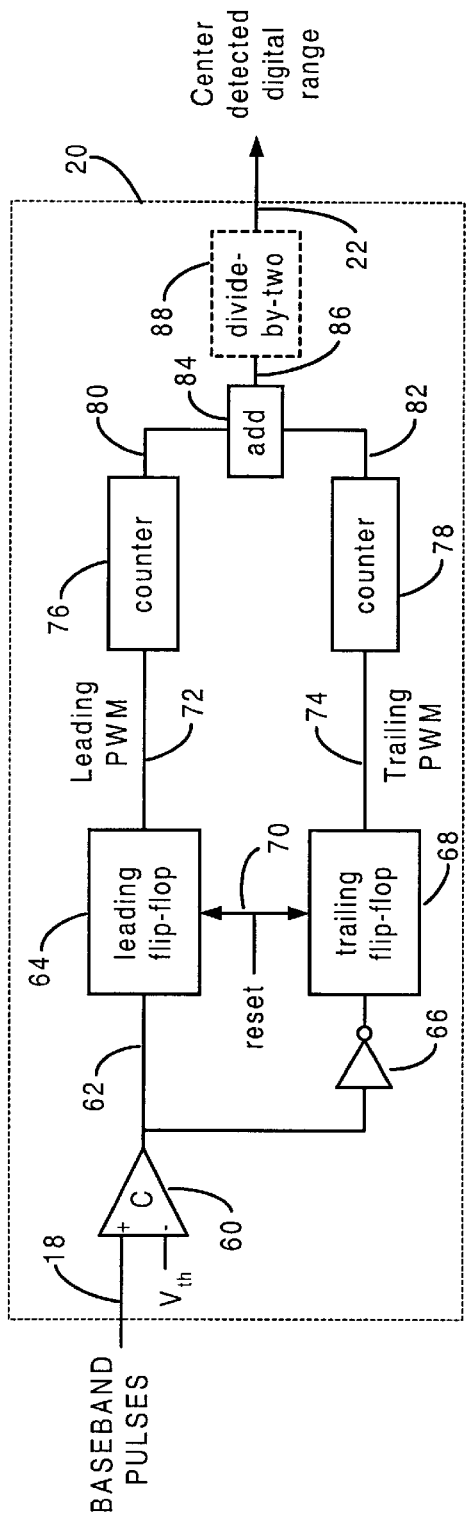
FIG. 3a is a block diagram of a PCD with a digital adder.

FIG. 3a is a block diagram of a digital implementation of pulse center detector 20. BASEBAND PULSES are input on line 18 to a fixed threshold comparator 60, which compares the pulses with a threshold $V_{th}$ and outputs DETECTION PULSES on line 62 to leading flip-flop 64 and to inverter 66, whose output coupled to trailing flip-flop 68. Leading flip-flop 64 and trailing flip-flop 68 produce LEADING-PWM and TRAILING-PWM pulses on lines 72 and 74, respectively. Flip-flops 64, 68 may be other logic elements. The width of the LEADING-PWM and TRAILING-PWM pulses correspond to the transmit-to-echo time delays of the leading and trailing edges of the corresponding T to E DETECTION PULSES of FIG. 2a. A reset is provided on line 70 to the flip-flops after each operation cycle (i.e., range sweep). It should be understood that flip-flops 64 and 68 may incorporate additional logic, such as a lock-out function, to prevent re-toggling if additional pulses beyond the two DETECTION PULSES are input within one operation cycle.

The LEADING-PWM and TRAILING-PWM pulses gate counters 76 and 78, respectively, which produce range counts on lines 80 and 82. Adder 84 adds the counts from lines 80 and 82 to produce an average count on line 86 which effectively corresponds to a count from a single PWM pulse centered on the T and E pulses, i.e., extending from center to center of the two pulses (neglecting a scale factor of 2). An optional divide-by-two circuit 88 scales the digital count from line 86 to compensate for the addition operation of element 84. However, the output on line 22 is usually in an unscaled binary format that requires processing by readout/processor 24 to present meaningful data scaled to some measurement quantity, for example, a fluid volume in a tank. Thus the scaling provided by divide-by-two element 88 can be incorporated in display/processor 24.

Figure 3B:
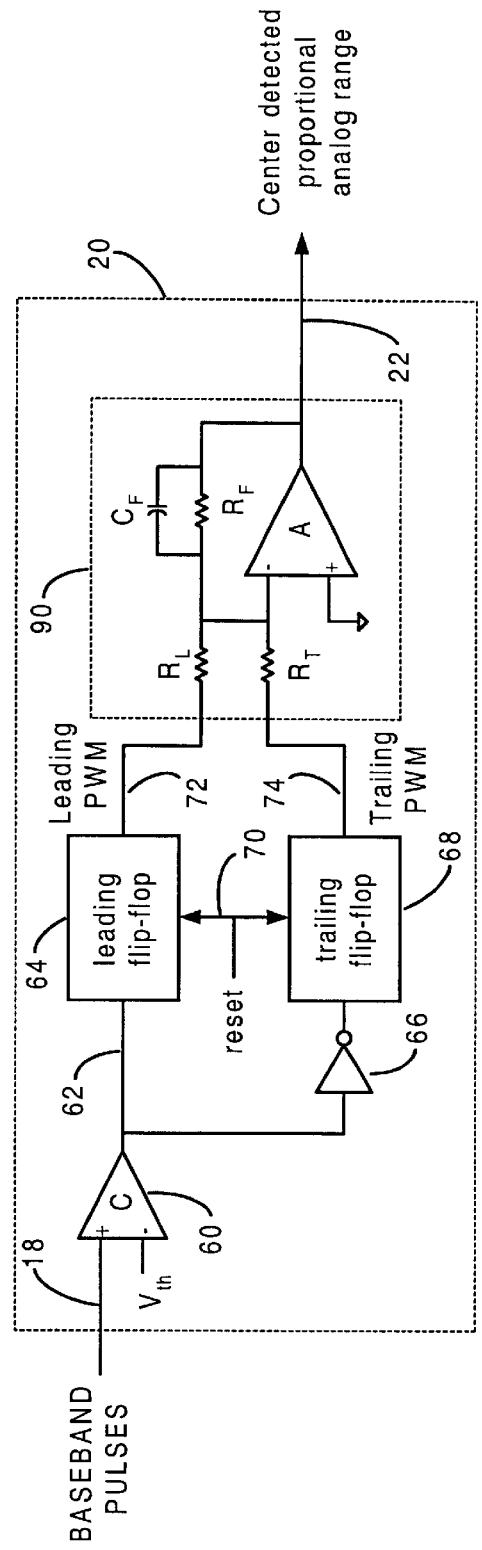
FIG. 3b is a block diagram of a PCD with an analog summer.

FIG. 3b is a block diagram of an analog implementation of pulse center detector 20. Elements 60, 64, 66 and 68, and lines 18, 62, 70, 72, and 74 have the same function as described with reference to FIG. 3a. The LEADING-PWM and TRAILING-PWM pulses on lines 72 and 74, respectively, are input to an analog summer 90 via resistors $R_L$ and $R_T$, respectively, which are both connected to one input of op amp A. A feedback connection comprising $R_F$ and $C_F$ across op amp A provides voltage scaling and pulse integration or smoothing to the PWM pulses input to $R_L$ and $R_T$. The time constant set by $R_F C_F$ is much longer than the PWM duration to smooth the PWM pulses. A lowpass filter may be connected to line 22 for further smoothing. Operational amplifier A outputs a voltage on line 22 that is the sum of the voltages on lines 72 and 74, integrated over time to a smooth DC value. Thus, summer 90 adds and smoothes the LEADING-PWM and TRAILING-PWM pulses to produce a proportional analog voltage that corresponds to a single smoothed PWM pulse centered on the T and E pulses, thereby implementing an amplitude-independent pulse center detection function.

If the leading or trailing edges of the baseband T or E pulses have different transition times, which would result in reduced amplitude independence for the PCD, either $R_L$ or $R_T$ can be scaled, i.e., weighted, to compensate the asymmetry and regain amplitude independence. For example if the trailing edges of the baseband T and E pulses are 2× slower than the leading edges, resistor $R_T$ would need to be doubled to regain amplitude independence. Weighting can also be accomplished digitally by simple means known in the art with respect to FIG. 3a.

Although the invention has been described with reference to an equivalent time radar or TDR, the principles of the PCD apply to other pulse-echo embodiments as well, such as a realtime radar or TDR. Changes and modifications in the specifically described embodiments can be carried out without departing from the scope of the invention, which is intended to be limited only by the scope of the appended claims.

What is claimed is:

1. An apparatus for detecting the centers of baseband transmit and echo pulses of a radar or time domain reflectometer (TDR), comprising:
   a threshold comparator for producing transmit and echo detection pulses from the baseband transmit and echo pulses;
   a leading-edge triggered logic element for producing a leading-PWM (pulse width modulation) pulse that starts with the leading edge of the transmit detection pulse and ends with the leading edge of the echo detection pulse;
   a trailing-edge triggered logic element for producing a trailing-PWM (pulse width modulation) pulse that starts with the trailing edge of the transmit detection pulse and ends with the trailing edge of the echo detection pulse;
   a first digital counter for producing a count output proportional to the leading-PWM pulse;
   a second digital counter for producing a count output proportional to the trailing-PWM pulse;
   a digital adder connected to the first and second counter outputs to produce a center detected output.

2. The apparatus of claim 1 further comprising a digital divide-by-two circuit connected to the center detected output to produce a scaled center detected output.

3. An apparatus for detecting the centers of baseband transmit and echo pulses of a radar or time domain reflectometer (TDR), comprising:
   a threshold comparator for producing transmit and echo detection pulses from the baseband transmit and echo pulses;
   a leading-edge triggered logic element for producing a leading-PWM (pulse width modulation) pulse that starts with the leading edge of the transmit detection pulse and ends with the leading edge of the echo detection pulse;
   a trailing-edge triggered logic element for producing a trailing-PWM (pulse width modulation) pulse that starts with the trailing edge of the transmit detection pulse and ends with the trailing edge of the echo detection pulse;
   an analog summer for adding the leading-PWM and trailing PWM pulses to produce a center-detected output.

4. In a pulse radar or TDR, an equivalent time pulse center detector (PCD) detector comprising:
   a comparator for threshold detecting transmit and echo pulses;
   a first flip-flop connected to the output of the comparator;
   a digital inverter connected to the output of the comparator;
   a second flip-flop connected to the output of the digital inverter;
   a first counter connected to the output of the first flip-flop;
   a second counter connected to the output of the second flip-flop;
   an adder connected to the outputs of the first and second counters.

5. In a pulse radar or TDR, an equivalent time pulse center detector (PCD) detector comprising:
   a comparator for threshold detecting transmit and echo pulses;
   a first flip-flop connected to the output of the comparator;
   a digital inverter connected to the output of the comparator;
   a second flip-flop connected to the output of the digital inverter;
   an analog summation element connected to the outputs of the first and second flip-flops.

6. A method for center-detecting radar or TDR transmit and echo pulses, comprising:
   threshold detecting the transmit and echo pulses;
   producing a leading-edge PWM pulse from the leading edges of the threshold detected transmit and echo pulses;
   producing a trailing-edge PWM pulse from the trailing edges of the threshold detected transmit and echo pulses;
   summing the leading-edge and trailing-edge PWM pulses to produce a center-detected range indication.

7. An apparatus for detecting the centers of baseband transmit and echo pulses of a radar or time domain reflectometer (TDR), comprising:
   a threshold comparator for producing transmit and echo detection pulses from the baseband transmit and echo pulses;
   a leading-edge triggered logic element for producing a leading-PWM (pulse width modulation) pulse that starts with the leading edge of the transmit detection pulse and ends with the leading edge of the echo detection pulse;
   a trailing-edge triggered logic element for producing a trailing-PWM (pulse width modulation) pulse that starts with the trailing edge of the transmit detection pulse and ends with the trailing edge of the echo detection pulse;
   summation circuitry for receiving the leading-PWM and trailing-PWM pulses and producing a center-to-center range output.

8. The apparatus of claim 7 wherein the summation circuitry comprises:

a first digital counter for producing a count output proportional to the leading-PWM pulse;

a second digital counter for producing a count output proportional to the trailing-PWM pulse;

a digital adder connected to the first and second counter outputs to produce a center detected output.

9. The apparatus of claim 7 wherein the summation circuitry comprises:

an analog summer for adding the leading-PWM and trailing-PWM pulses to produce a center-detected output.

10. A pulse radar or TDR system, comprising:

a pulse radar or TDR for transmitting transmit pulses and receiving echo pulses;

a pulse center detector (PCD) connected to the pulse radar or TDR for determining the range between the center of a transmit pulse and the center of an associated echo pulse, wherein the PCD comprises:

a threshold comparator for producing transmit and echo detection pulses from the transmit and echo pulses;

a leading-edge triggered logic element for producing a leading-PWM (pulse width modulation) pulse that starts with the leading edge of the transmit detection pulse and ends with the leading edge of the echo detection pulse;

a trailing-edge triggered logic element for producing a trailing-PWM (pulse width modulation) pulse that starts with the trailing edge of the transmit detection pulse and ends with the trailing edge of the echo detection pulse;

summation circuitry for receiving the leading-PWM and trailing-PWM pulses and producing a center-to-center range output.

11. The system of claim 10 wherein the summation circuitry comprises:

a first digital counter for producing a count output proportional to the leading-PWM pulse;

a second digital counter for producing a count output proportional to the trailing-PWM pulse;

a digital adder connected to the first and second counter outputs to produce a center detected output.

12. The system of claim 10 wherein the summation circuitry comprises an analog summer for adding the leading-PWM and trailing-PWM pulses to produce a center-detected output.

13. A pulse radar or TDR system, comprising:

a pulse radar or TDR for transmitting transmit pulses and receiving echo pulses;

a pulse center detector (PCD) connected to the pulse radar or TDR for determining the range between the center of a transmit pulse and the center of an associated echo pulse, wherein the PCD comprises:

a comparator for threshold detecting the transmit and echo pulses;

a first flip-flop connected to the output of the comparator;

a digital inverter connected to the output of the comparator;

a second flip-flop connected to the output of the digital inverter;

a first counter connected to the output of the first flip-flop;

second counter connected to the output of the second flip-flop;

an adder connected to the outputs of the first and second counters.

14. A pulse radar or TDR system, comprising:

a pulse radar or TDR for transmitting transmit pulses and receiving echo pulses;

a pulse center detector (PCD) connected to the pulse radar or TDR for determining the range between the center of a transmit pulse and the center of an associated echo pulse, wherein the PCD comprises:

a comparator for threshold detecting the transmit and echo pulses;

a first flip-flop connected to the output of the comparator;

a digital inverter connected to the output of the comparator;

a second flip-flop connected to the output of the digital inverter;

an analog summation element connected to the outputs of the first and second flip-flops.

* * * * *